US008892244B1

(12) United States Patent
Taylor et al.

(10) Patent No.: US 8,892,244 B1
(45) Date of Patent: Nov. 18, 2014

(54) AUTOMATED TILE PLACEMENT MACHINE

(71) Applicant: Armorworks Enterprises, LLC, Chandler, AZ (US)

(72) Inventors: Jay A. Taylor, Mesa, AZ (US); Chris Stephen Hanisko, Chandler, AZ (US); Aubrey Donald Ridgeway, Queen Creek, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 180 days.

(21) Appl. No.: 13/737,203

(22) Filed: Jan. 9, 2013

Related U.S. Application Data

(60) Provisional application No. 61/584,523, filed on Jan. 9, 2012.

(51) Int. Cl.
*G06F 7/00* (2006.01)
*G05B 11/00* (2006.01)

(52) U.S. Cl.
CPC ............... *G05B 11/00* (2013.01); *Y10S 901/40* (2013.01); *Y10S 901/46* (2013.01)
USPC ............... 700/218; 156/64; 414/729; 901/40; 901/46

(58) Field of Classification Search
USPC ........................................................ 700/218
See application file for complete search history.

(56) References Cited

U.S. PATENT DOCUMENTS

| 5,568,391 | A | 10/1996 | Mckee |
| 5,913,992 | A * | 6/1999 | Gerber ........................... 156/64 |
| 7,067,031 | B2 | 6/2006 | deWitt |
| 7,225,717 | B2 | 6/2007 | Williams |
| 2004/0265110 | A1 * | 12/2004 | Schnoor et al. ............... 414/729 |

* cited by examiner

*Primary Examiner* — Gene Crawford
*Assistant Examiner* — Kyle Logan
(74) *Attorney, Agent, or Firm* — James L Farmer

(57) ABSTRACT

Methods and apparatus are provided for the automated assembly of individual tiles on a surface in a predetermined pattern. In one exemplary embodiment, an automated apparatus comprises a tile dispenser with an open ended shoe portion adapted for holding a stack of regularly shaped tiles, and a tile advancement mechanism for incrementally advancing tiles in the shoe toward the open end thereof. The automated apparatus may further comprise a robotic mechanism adapted to retrieve a tile from the end of the tile stack, and place the tile on the surface.

16 Claims, 23 Drawing Sheets

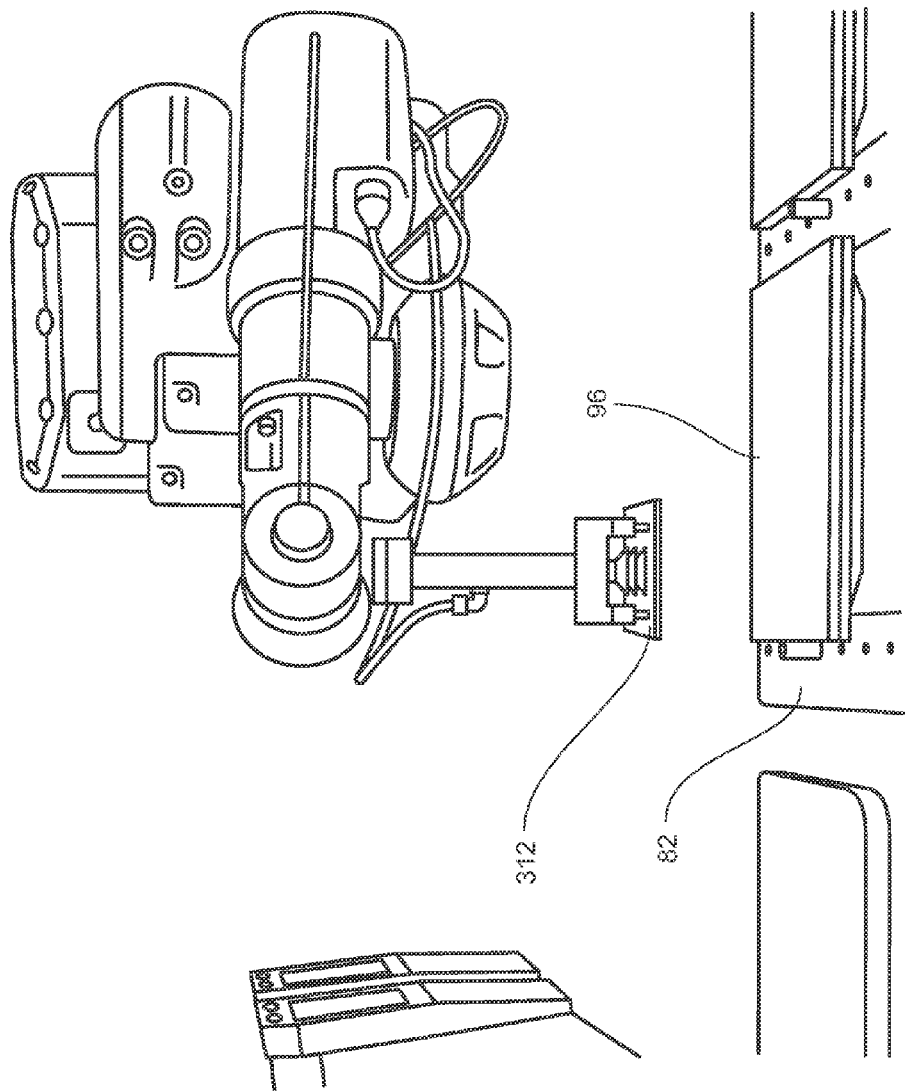

AUTOMATED TILE PLACEMENT MACHINE

This application claims the benefit of U.S. Provisional Application No. 61/584,523, filed Jan. 9, 2012, the entire contents of which are hereby incorporated by reference.

TECHNICAL FIELD AND BACKGROUND

The instant invention relates generally to surfaces and panels comprising individual tiles arranged in a predetermined pattern, and methods of constructing such surfaces and panels. The technical field may include, for example, ballistic armor panels comprising regularly shaped ballistic grade ceramic tiles arranged in a close fitting assembly on a backing made of ballistic resistant composite materials.

BRIEF DESCRIPTION OF THE DRAWINGS

In the accompanying drawings:

FIGS. 14 through 17 depict a robot end effector retrieving a tile from a tile dispenser and placing the tile onto a panel substrate positioned atop the assembly table;

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Terms such as "connected" or "attached" as used herein are intended to denote direct, indirect (with intermediate elements), rigid, and flexible linking arrangements, as well as linking arrangements with one or more degrees of freedom.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
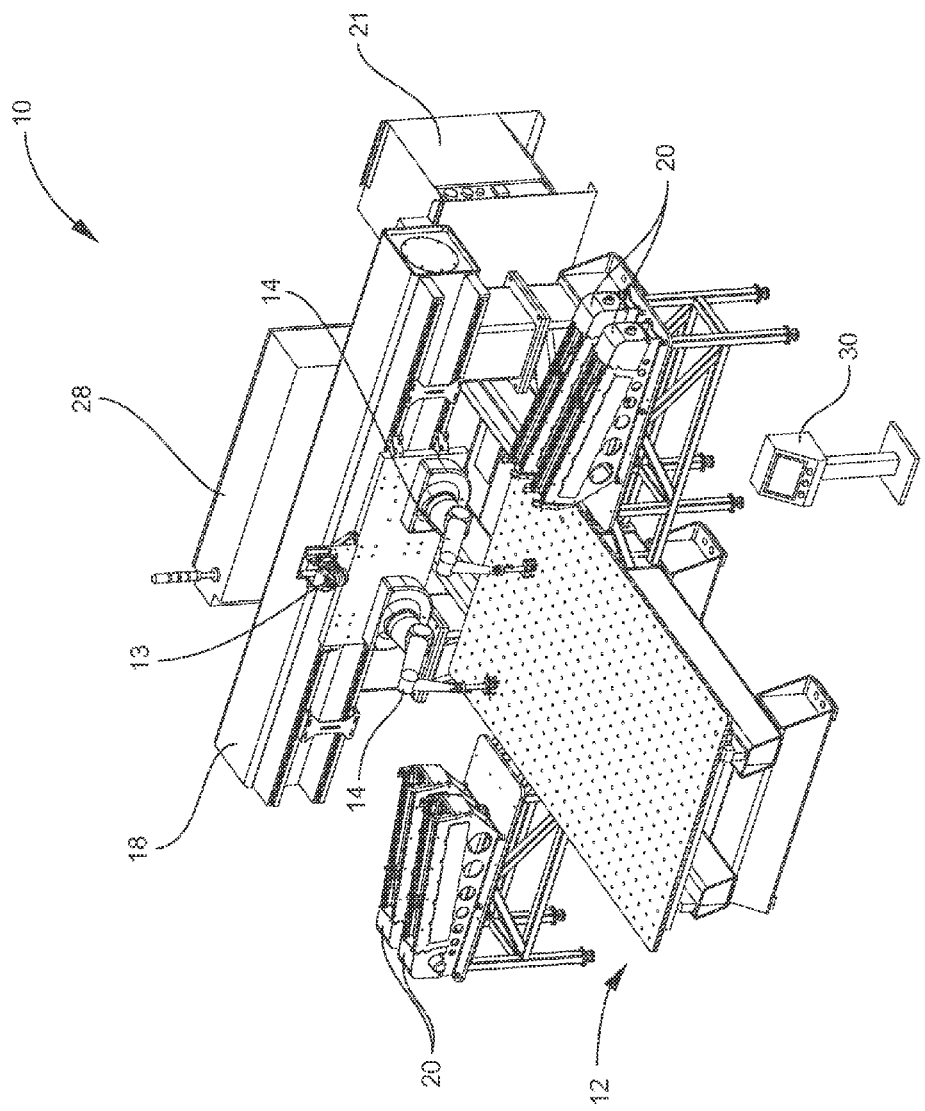
FIG. 1 is a perspective view of an exemplary automated tile placement machine in accordance with the present disclosure.

Referring now to the drawing figures, an exemplary automated tile placement machine in accordance with the present disclosure is indicated generally in FIG. 1 at reference numeral 10. The operative mechanical elements comprise a linearly movable assembly table 12, left and right robots 14 mounted above the assembly table 12 to a gantry 18, and left and right tile dispensers in the form of automatic tile feeders 20. The tile placement machine 10 may further include automatic control elements, comprising for example left and right machine controllers 21, a programmable logic controller (PLC) 28, a human machine interface (HMI) station 30, and a perimeter encroachment sensor 13. In general, the tile placement machine retrieves individual tiles one at a time from the tile feeders 20, and assembles them on the movable assembly table 12 in a predetermined pattern. The tile placement machine may be utilized in this manner, for example, to assemble ballistic armor panels using ballistic grade ceramic tiles arranged in a specific manner dictated by a particular tactical application.

Figure 2:
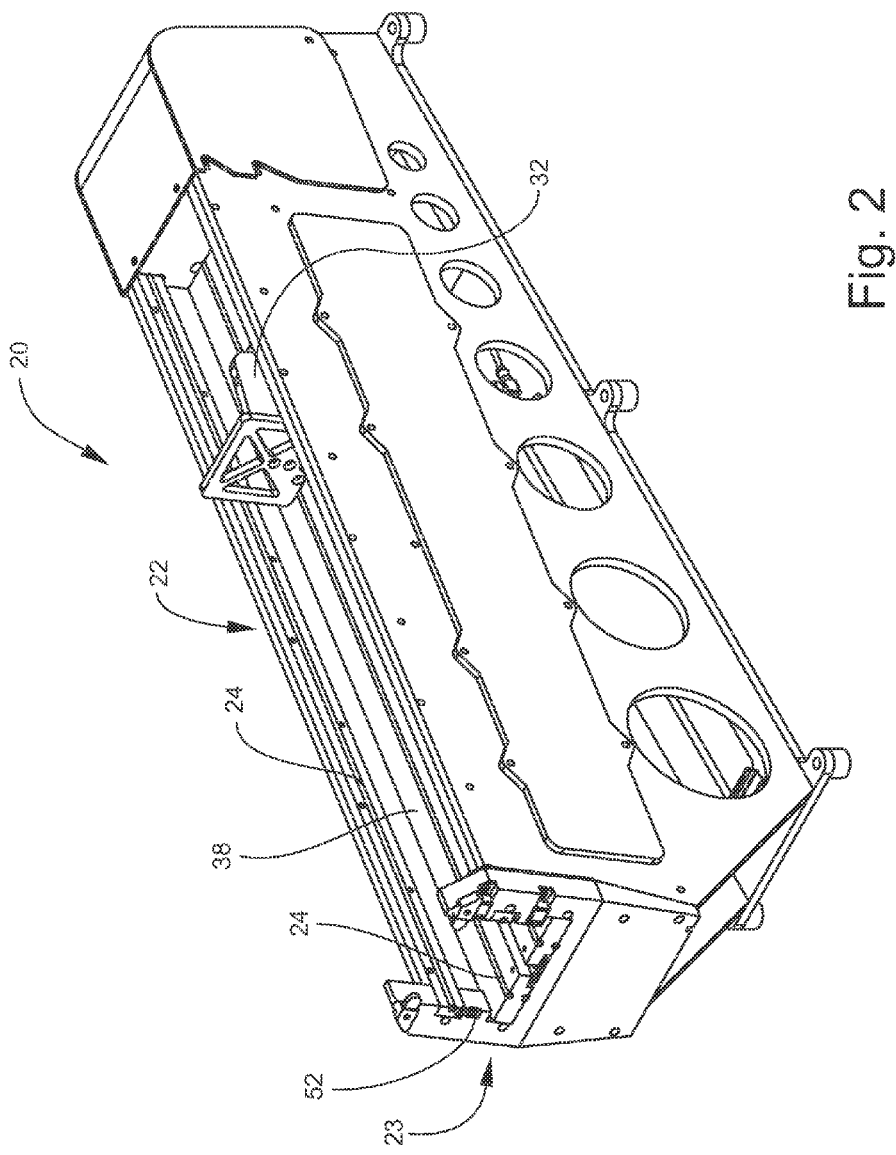
FIG. 2 is a perspective view of a tile dispenser portion of the tile placement machine of FIG. 1.

FIG. 2 depicts an exemplary tile dispenser in the form of automatic tile feeder 20. The tile feeder 20 includes a shoe 22 that is essentially an elongated channel with an open end 23, and adapted to hold a stack of regularly shaped tiles. The shoe 22 may include protruding guide rails 24 along the sides and bottom of the channel to facilitate tile alignment and to guide the tiles as they advance through the shoe toward the open end 23. In the depicted embodiment, there are two evenly spaced guide rails 24 in the bottom of the channel, and one guide rail 24 on each side. The guide rails may be of any cross-sectional shape, such as flat or round, and made from any dimensionally stable material having a relatively low friction coefficient, particularly with respect to ceramic. For example, in one exemplary embodiment the guide rails are round steel rods.

Figure 5:
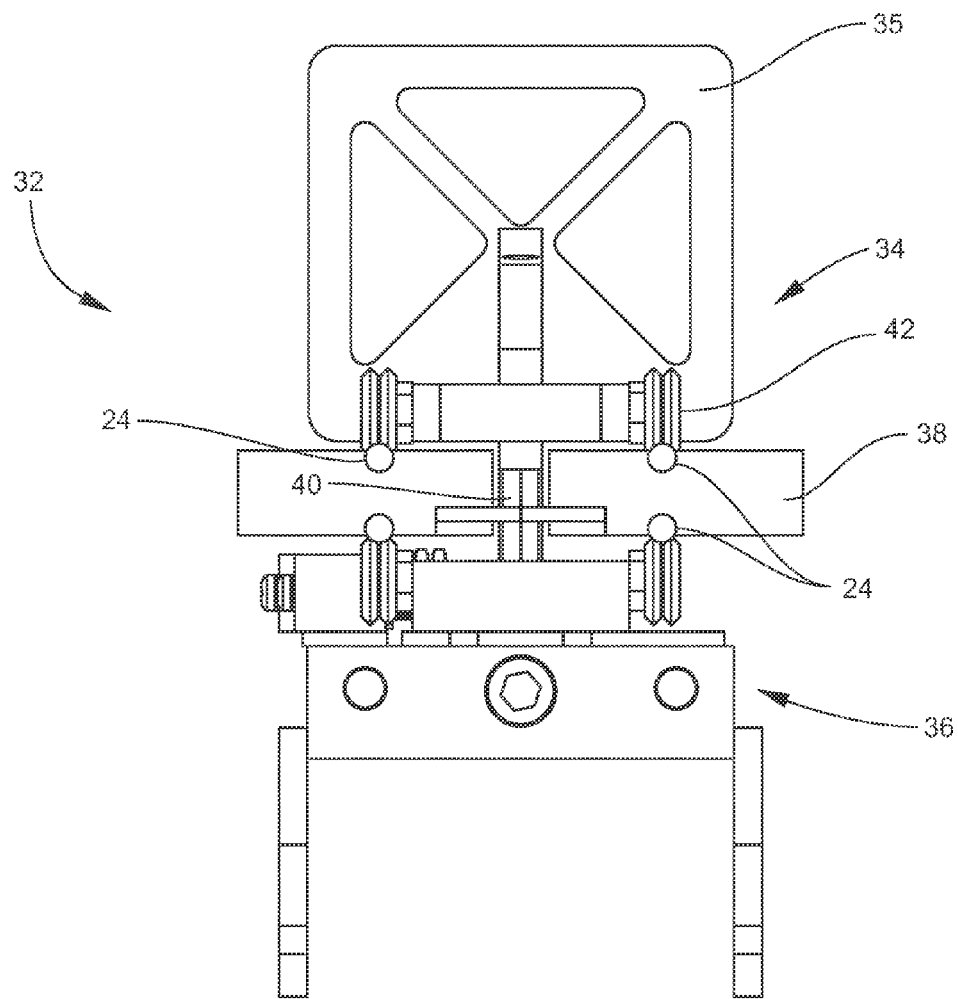
FIG. 5 is an end view of the trolley and track portion of FIG. 4.
Figure 6:
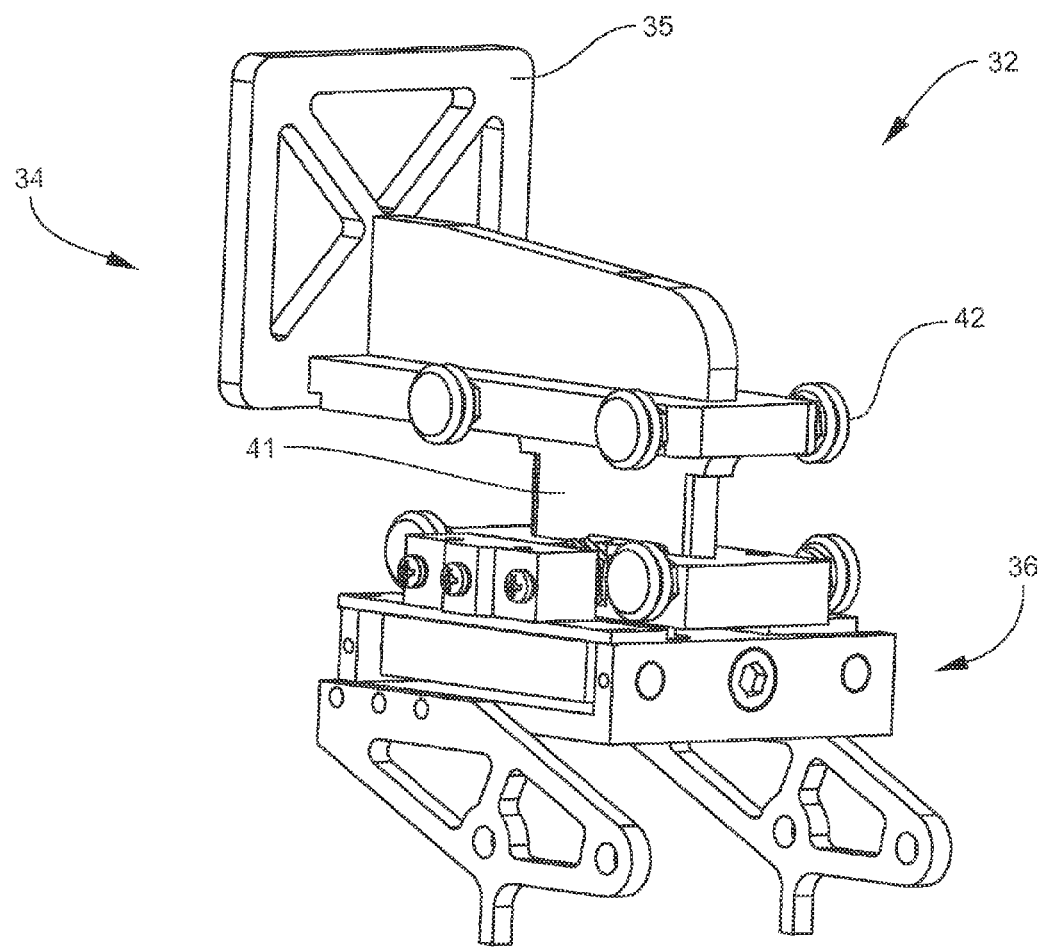
FIG. 6 is a perspective view of the trolley portion only of FIG. 4.

In addition to guiding the tiles, the guide rails 24 may also act as tracks for a trolley 32, best seen in FIGS. 3 through 6. The trolley 32 is a tile advancement mechanism, essentially in the form of a motor driven push plate for incrementally advancing a stack of tiles in the shoe 22 toward the open end 23. In the illustrated embodiment the trolley mechanism 32 comprises an upper carriage 34 and lower carriage 36 movably disposed on opposite sides of the shoe floor 38. The front of the upper carriage 34 comprises a push plate 35 that defines the effective length of shoe 22, and in operation bears directly against the stack of tiles. As best seen in FIG. 5, the shoe floor 38 has a central slot 40 to allow for a mechanical connection 41 between the upper and lower carriages 34, 36. The shoe floor 38 also has a pair of spaced apart guide rails 24 on the bottom side mirroring those on the top side of the floor, with both sets of rails 24 serving as tracks for the wheels 42 of both upper and lower carriages. Thus the trolley 32 is freely movable along the length of shoe 22 via wheels 42 rolling along the rails 24 on both sides of shoe floor 38.

Figure 3:
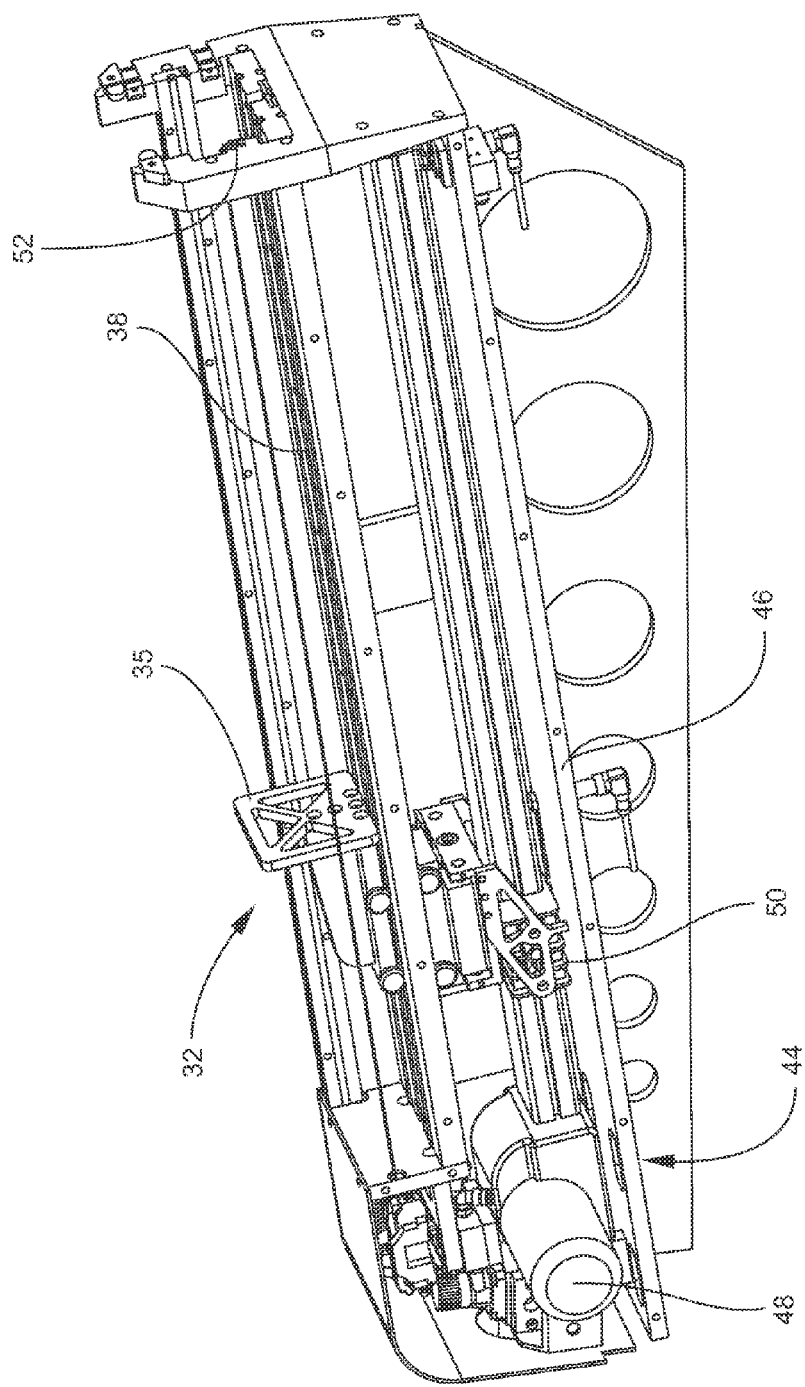
FIG. 3 is a partial cutaway side view of the tile dispenser of FIG. 2.
Figure 4:
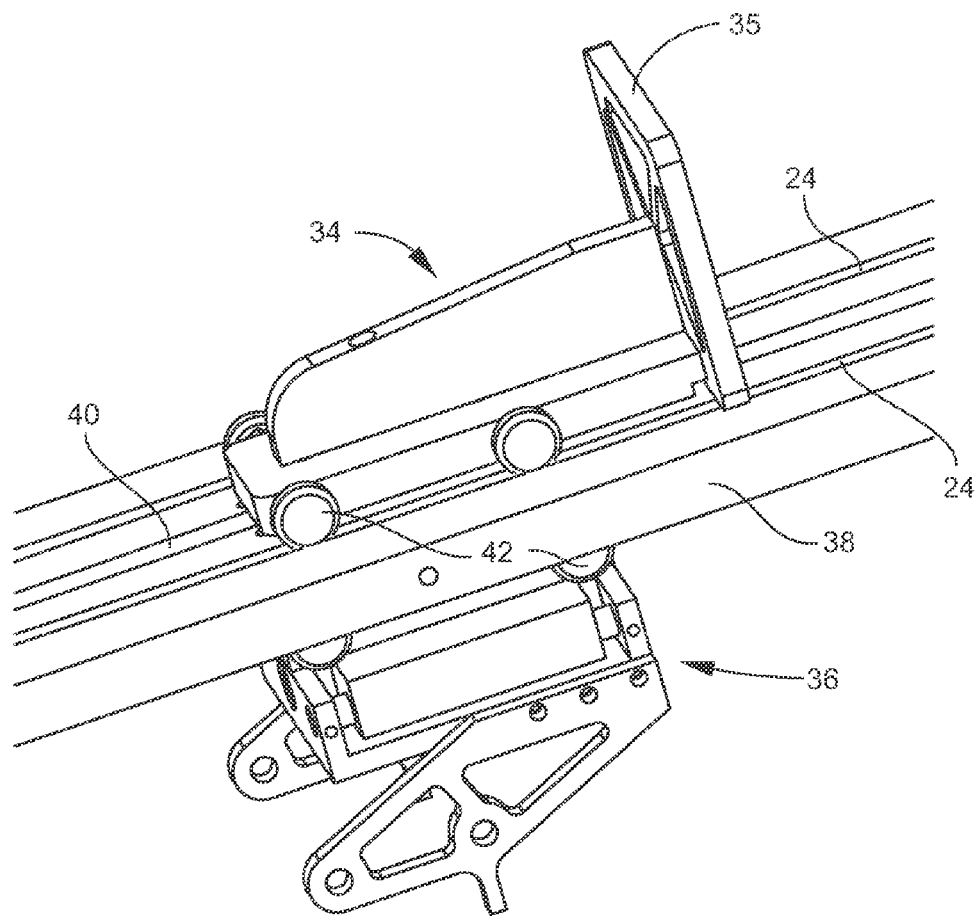
FIG. 4 is a perspective view of a trolley and track portion of the tile dispenser of FIG. 2.
Figure 7:
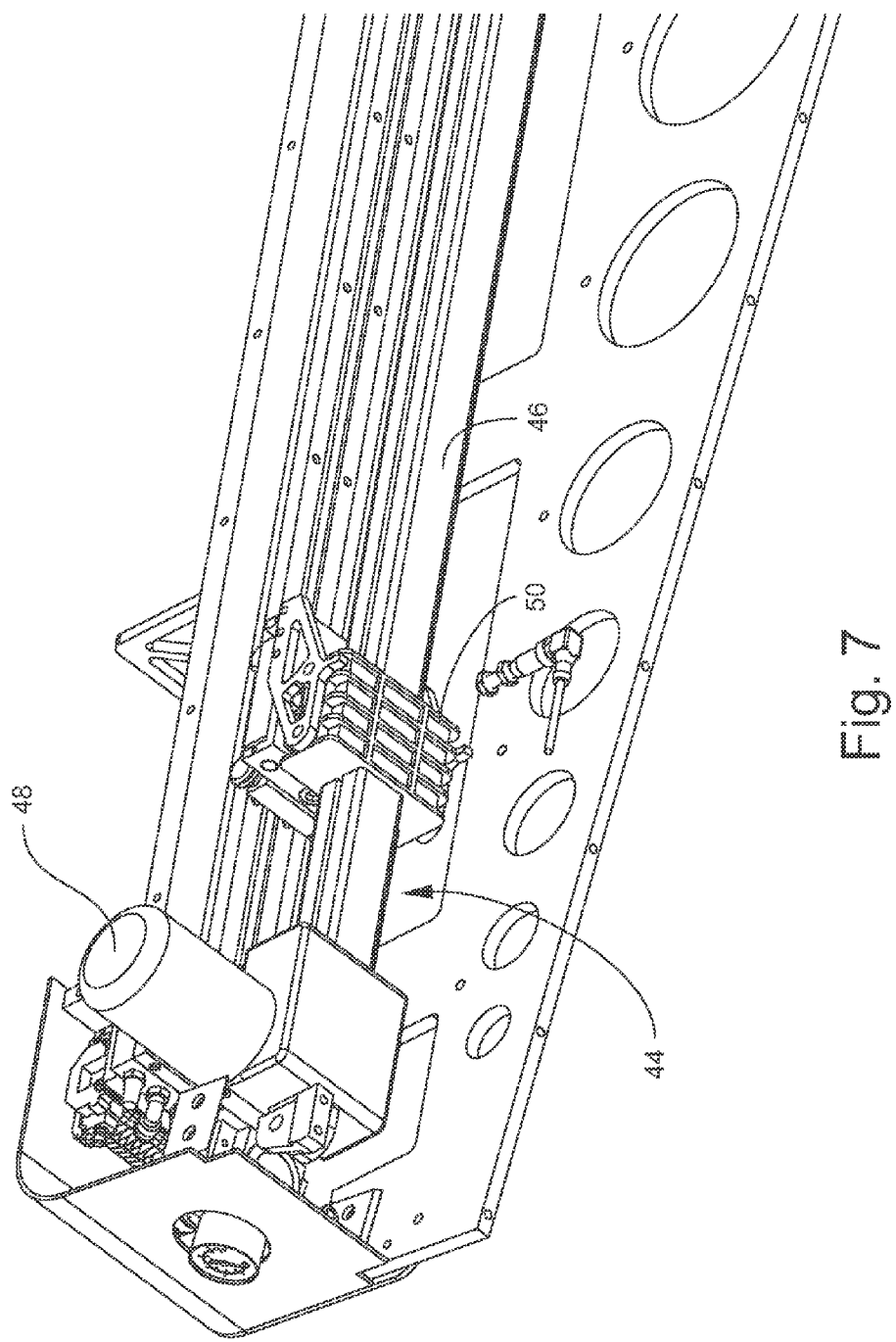
FIG. 7 is a perspective view of the linear actuator portion of the tile dispenser of FIG. 2.

Referring now to FIG. 7 and also FIG. 3, the trolley mechanism 32 is positively advanced along the shoe 22 by means of a linear actuator, indicated generally at reference numeral 44. The linear actuator 44 may be any suitable form of known mechanical, electrical, or hydraulic device, or combination thereof adapted for incrementally advancing the trolley 32. For example, in the illustrated embodiment the linear actuator 44 comprises a drive track 46 containing a lead screw (not shown) rotatably driven by a motor 48. The trolley mechanism 32 is slidably connected to the drive track 46 by a guide housing 50, and operatively engaged with the lead screw by a lead nut internal to housing 50. The trolley mechanism 32, along with tiles stacked in front of the push plate 35 may thus be incrementally advanced along the shoe 22 toward the open end 23 by starting and stopping motor 48 in a controlled manner.

In accordance with one embodiment the linear actuator 44 via motor 48 is started and stopped in response to sequenced electronic signals. For example, the actuator may be started in response to a first signal generated by the control system, and stopped in response to a second signal generated by a position sensor. The first signal may be automatically generated by the control system in response to a particular preceding event, such as the removal of a tile from shoe 22 by a robot 14. Upon receiving the first signal, the actuator 44 begins pushing the stack of tiles toward the open end 23 of shoe 22.

Figure 8:
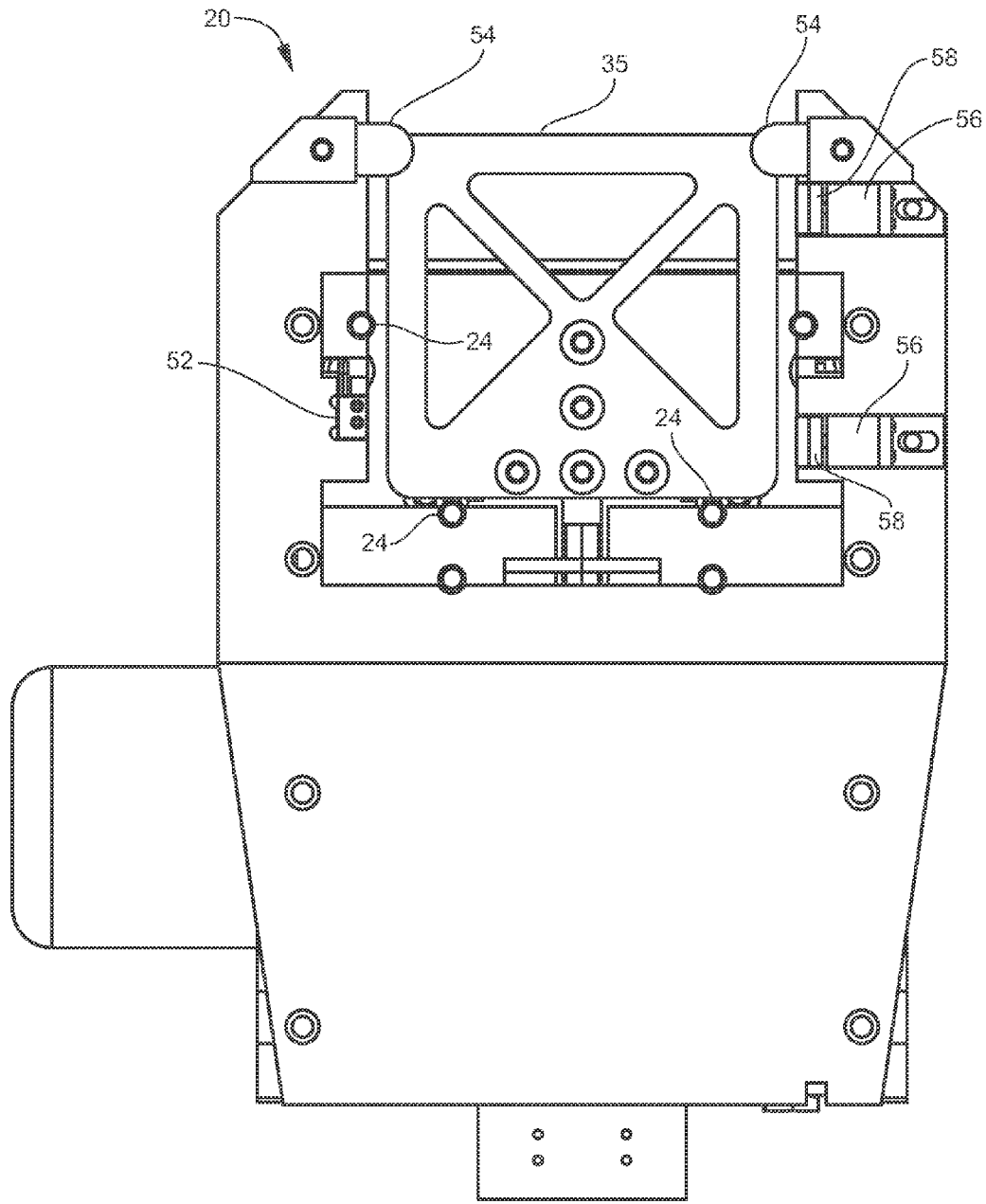
FIG. 8 is an end elevation of the tile dispenser of FIG. 2.

A second signal may be generated using a tile position sensor to detect when the stack of tiles in shoe 22 has advanced by a certain amount such as by the thickness of one tile. Referring to FIG. 8, an exemplary position sensor in the form of a laser switch 52 is located at the open end 23 of shoe 22, and aimed directly across the path of the advancing tile stack. The laser switch 52 is tripped when the front tile of the stack breaks the beam, generating a second signal, and stopping the linear actuator and tile stack at that point. Then, once the front tile is removed by a robot 14, a first signal is again generated by the control system, and the above described sequence repeats.

The open end 23 of shoe 22 may further comprise registration means for accurately and consistently positioning the front tile for robot pick up. For example, in the embodiment shown in the drawings, the registration means involves pushing the tile against a physical stop. Referring again to FIG. 8, the pushing is accomplished using upper and lower pneumatic actuators 56 disposed on one side of the open end 23 of shoe 22. The actuators are positioned to be aligned with the edge of the front tile in a stack, and may be vertically positioned to work with standard tile sizes, such as 4 inch square tiles, or 2 inch×4 inch rectangular tiles. When activated, the moving portions 58 of one or both actuators 56 extend toward the edge of the front tile, driving the tile laterally against the guide rail 24 on the opposite side of the shoe 22. The actuators may then be retracted, leaving the tile in contact with one side rail 24 and both bottom guide rails 24. The resulting three point contact with the guide rails 24 provides a repeatable tile position for facilitating consistent retrieval by a robot 14.

As shown in FIG. 1, the tile placement machine 10 may comprise two automatic tile feeder 20 adjacent each side of the table 12. The tile feeders 20 are positioned such that the shoes 22 are tilted back at an angle to the horizontal with the open end 23 elevated. Tilting the shoe back in this way serves to keep the stacked tiles together and against push plate 35, as well as reducing the tendency for the front tile in the stack to topple out of the shoe. The shoe may also include flexible tabs 54 located on the end of the shoe near the top, that project into the path of the advancing tile stack for providing additional security to the front tile. The tabs 54 are stiff enough to prevent the front tile from falling after the linear actuator stops, but flexible enough to be easily displaced by the edge of the front tile when tile is withdrawn by the robot 14 for placement on the movable table 12.

Once accurately positioned at the end of the shoe, the front tile in the stack is retrieved by a robot 14 and placed in a predetermined position on the table 12. The robot 14 may comprise various robotic mechanisms or combinations of mechanisms. For example, in the embodiment shown in FIG. 1, robot 14 is a high precision, six axis robot of the type typically used for industrial manufacturing and assembly. One such example of a suitable commercially available six-axis robot is the model IRB 140 sold by The ABB Group, located in Zurich, Switzerland.

Robot 14 may be fixed to the gantry 18 at a location such that it can reach the tile feeders 20 on one side of the table 12, and at least one half of the table. As can be seen with reference to FIG. 1, the tile placement machine 10 may be configured with left and right robots 14 and tile feeders 20 for accessing respective left and right halves of table 12. It should be appreciated that additional degrees of freedom may be added to the robotic system, such as for example the ability to translate the robots laterally with respect to gantry 18, should such capability be desirable or more efficient for a particular machine configuration.

Figure 9:
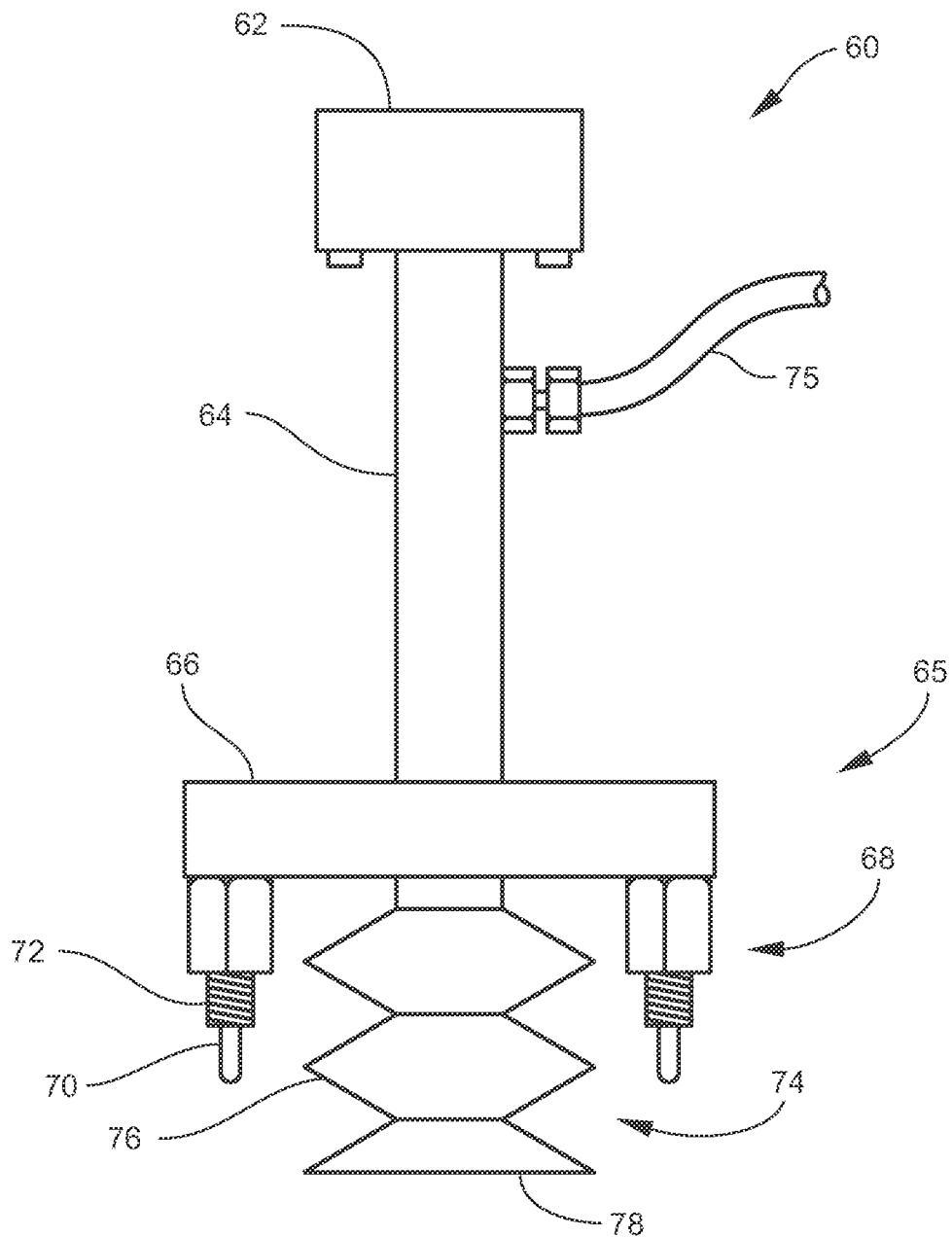
FIG. 9 is an exemplary robotic end effector in accordance with the present disclosure.

Tiles are retrieved from the tile feeders 20 using a suitable chuck, or end effector on the robot 14. FIG. 9 depicts an exemplary vacuum type end effector 60 comprising a mounting bracket 62 for attachment to the robot, a hollow post 64 extending from bracket 62, and a chuck assembly 65 at the end of post 64. Chuck assembly 65 comprises a chuck plate 66 with four compliant tile supports 68, one at each corner of plate 66 on the side opposite post 64. Each compliant tile support 68 comprises a spring loaded pin 70 in an adjustable pin housing 72. An internal compression spring biases the pin 70 out of the housing 72, and provides compliance when the pin is pressed against a fixed object such as a tile.

The chuck assembly further comprises a rubber bellows 74 that extends from the center of chuck plate 66 on the same side as the tile supports 68. The bellows 74 may comprise multiple segments 76 as shown, ending at a suction cup 78. A contiguous vacuum passage through plate 66, post 64, and bracket 62 connects bellows 74 through a hose 75 to a vacuum pump located in robot 14. A surface of an object may be gripped by placing the suction cup 78 against the surface and pumping down the pressure in bellows 74. The reduced pressure holds the suction cup 78 firmly to the surface, and also causes bellows segments 76 to contract, thereby pulling the gripped object toward the chuck plate 66 and into pressing contact with spring pins 70. It should be appreciated that the springs supporting pins 70 may be configured such that some or all of the pins 70 are forced at least partially into housings 72 from the force applied to the pins by a gripped object. The spring compliance and vacuum level may be effectively used in this manner to firmly seat a gripped surface against all four pins. A surface gripped by the end effector 60 may be released by simply releasing the applied vacuum.

Figure 10:
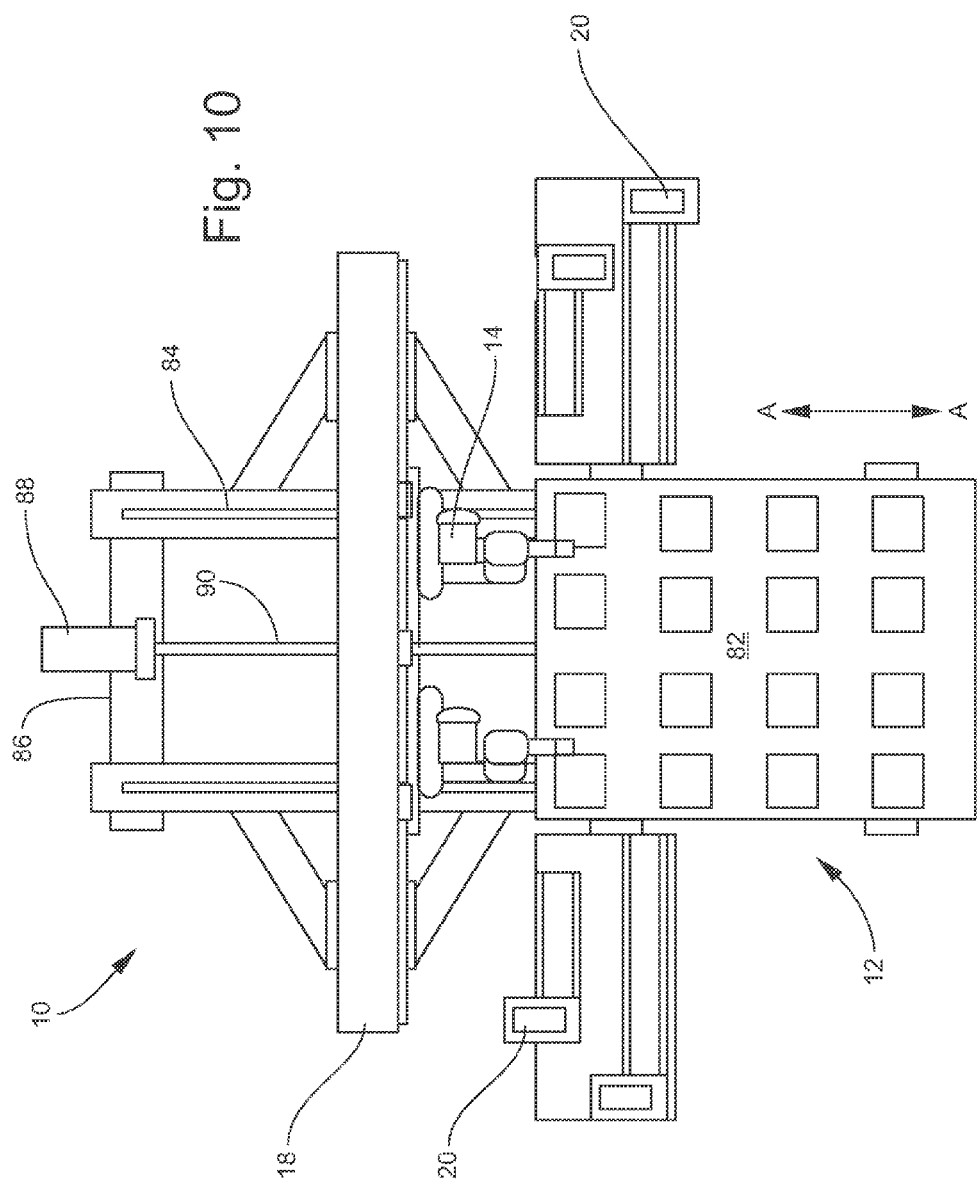
FIG. 10 is a top plan view of an exemplary tile placement machine showing the movable assembly table and table drive system.

FIG. 10 depicts an assembly table 12 in accordance with the present disclosure, comprising generally a table top 82 mounted on a pair of frame rails 84 atop a base 86. The table top 82 is a very flat and rigid plate made of a suitable high strength and warp resistant material such as aluminum. The top 82 is fitted with suitable bushings or rollers underneath that allow it to freely slide back and forth along frame rails 84 in the directions indicated by arrows "A". A drive system comprising a motor 88 and lead screw 90, similar in principle to the arrangement described above in reference to the shoe 22, may be used to very accurately move and position the table top 82 at desired points along the frame rails 84.

Figure 11:
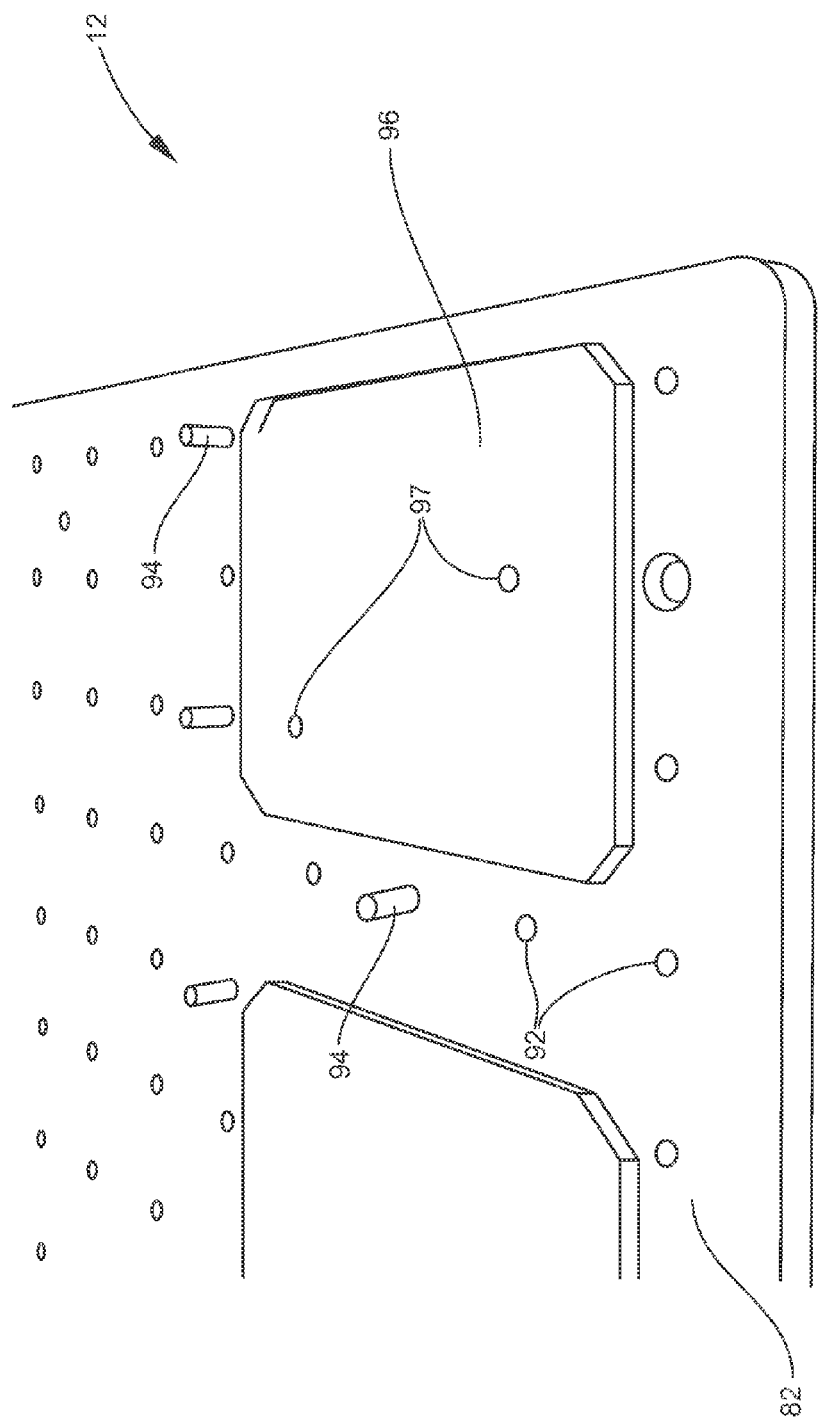
FIG. 11 is a perspective view of a portion of an exemplary movable assembly table equipped with various mounting fixtures.

Referring to FIG. 11, the table top 82 may include an array of holes 92 for receiving steel dowel pins 94 used for positioning and fixing various articles to the table surface. For example, as will be described in greater detail below, the dowel pins 94 may be used as pilot surfaces to guide the edges of a tile being placed onto the table, or to accurately position a panel substrate onto which tiles will be placed. Dowel pins may also be conveniently used to mount fixtures or other articles to the table top, such as for example the panel assembly plate 96 as shown in FIG. 11. In particular, each panel assembly plate 96 may be pinned at two locations through mount holes 97 that are configured to align with a respective pair of holes 92 in the table. The dowel pins used in holes 97 are sized to be at least slightly below flush with the top of assembly plates 96.

Figure 12:
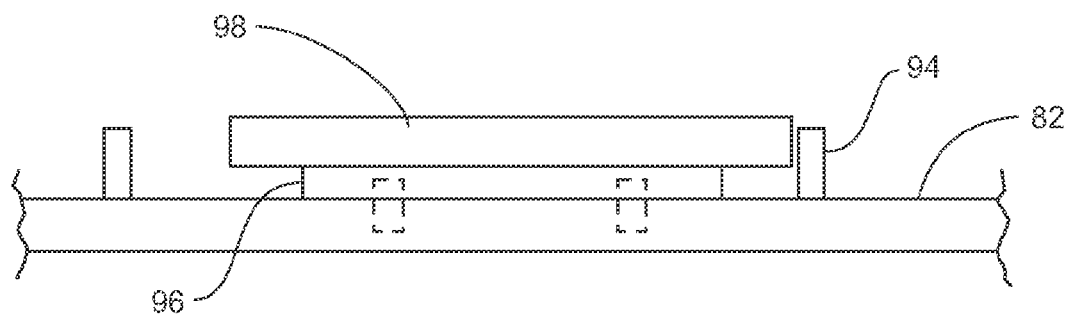
FIG. 12 is a schematic side view of the table and mounting fixtures of FIG. 11 supporting a panel substrate.

Taller dowel pins 94 may be located in holes 92 around and between the panel assembly plates 96, and used for example to position a panel substrate 98 atop the panel assembly plate 96 as shown in the cross-section view of FIG. 12. In the case of an armor panel, the panel substrate 98 may be a rigid, ballistic composite material forming an integral portion of the finished panel. As can be seen, the panel substrate 98 is larger than, and overhangs assembly plate 96, facilitating hand removal of the panel substrate from the assembly table after a tile assembly process.

Instead of the holes and dowel pins described above, the table top 82 may alternatively comprise various other fixtures or systems for positioning or holding workpieces on the table. For example, in one alternative embodiment the table top includes an array of threaded holes for receiving threaded fasteners that may be used to pilot or clamp workpieces to the table top. In another alternative embodiment the table top is a vacuum chuck comprising an array of relatively small holes connected to a vacuum source. In addition, various other fixtures and mounting devices are foreseeable to those skilled in the art, and within the scope of the present disclosure.

Figure 13:
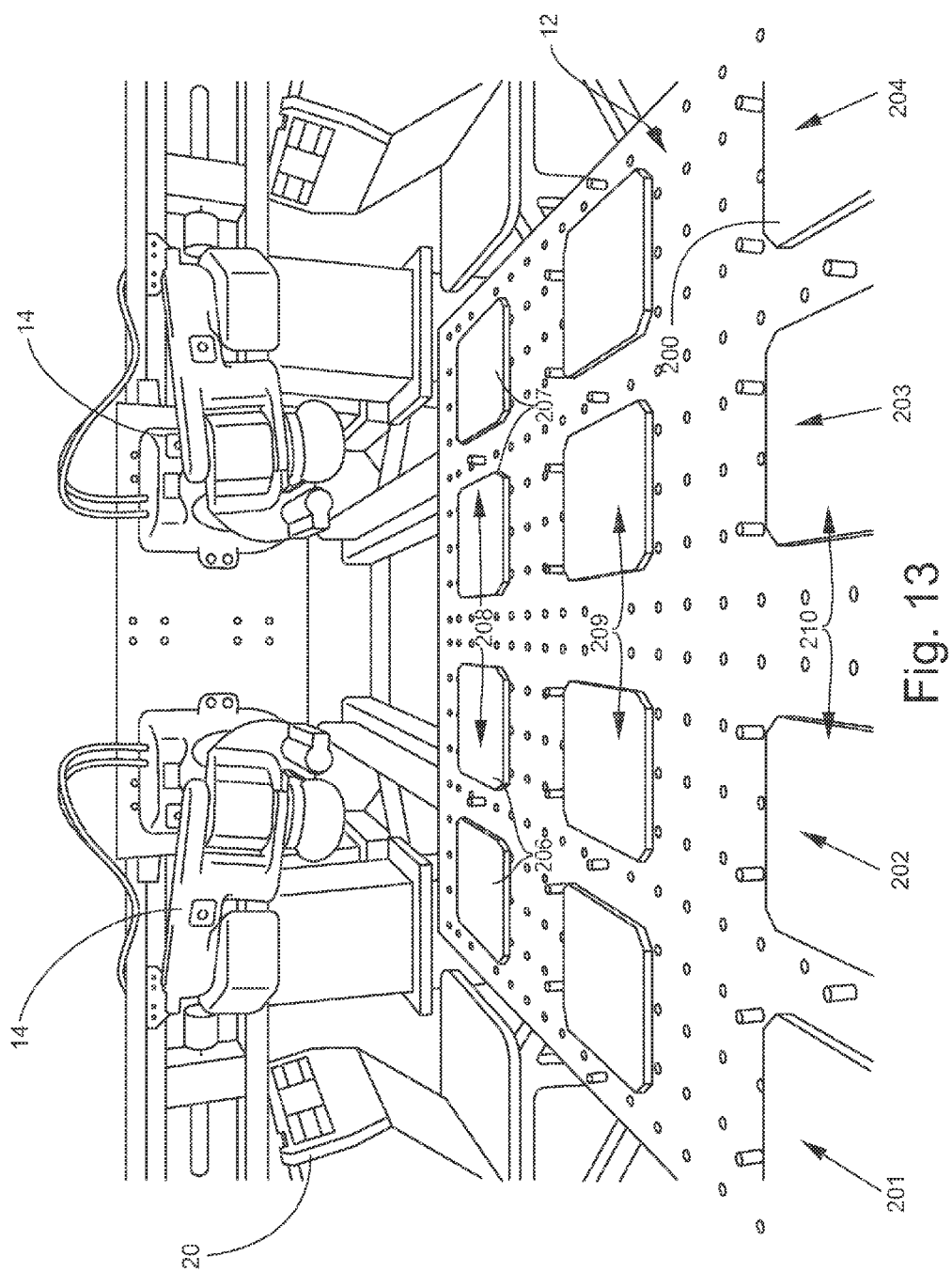
FIG. 13 is a perspective view of an exemplary tile placement machine equipped with an array of mounting fixtures atop the movable assembly table.

The tile placement machine is capable of simultaneously assembling two tile panels by utilizing both robots 14 and tile feeders 20 on both sides of table 12. As shown in FIG. 13, table 12 may be configured with multiple lanes of panel assembly stations 200, such that half of the assembly stations are accessible by the left robot 14, and half accessible by the right robot. The number of lanes, and the number of assembly stations per lane may of course vary depending upon the type and size of panels being constructed. For example, the machine could be used to assemble one large panel instead of multiple lanes of smaller panels, with the left and right robots 14 assembling their respective halves of the large panel.

The movable table embodiment of FIG. 13 comprises four lanes: lanes 201 and 202 on the left side; and lanes 203 and 204 on the right side. The table may be initially positioned with a first row 208 of four assembly stations, one from each of lanes 201 through 204, located proximate robots 14 for initiating tile placement. So positioned, the left and right robots 14 may be operated to simultaneously assemble tile panels at left and right assembly station pairs 206 and 207 respectively of row 208, moving the table top 82 as required during the assembly process. Once the four panels of row 208 are complete, the table may then be moved to a starting position for the next row (209) of assembly stations 200 to begin assembly of four more tile panels.

The tile placement machine is also capable of constructing tile panels using tiles of more than one type. The various tile types may include for example variations in tile size, shape, material, hardness, strength, color, surface finish, or other attributes. For example, referring again to the table assembly of FIG. 13, a tile feeder 20 adjacent the left side of the table may contain a first tile type, used exclusively in panels constructed in lanes 201 and 202, while a tile feeder on the right side of the table may contain tiles of a second type used exclusively in panels constructed in lanes 203 and 204. Alternatively, the tile placement machine may comprise two tile feeders 20 adjacent each side of the table 12, with one containing a first type of tile, and the other containing a second type of tile. In this kind of configuration, each robot is capable of constructing panels using exclusively the first or second types of tiles, or panels using both types of tiles.

In one exemplary embodiment, the tile placement machine comprises two tile feeders adjacent one another on each side of the table as shown for example in FIGS. 1 and 13, with one tile feeder on each side adapted for square tiles, and the other tile feeder adapted for rectangular tiles the size of a square tile cut in half. Of course the tile placement machine may be configured with more than two tile feeders per side, and more than two tile types as may be dictated by any particular application or production schedule.

An exemplary process of retrieving tiles from shoe 22 and assembling the tiles on table 12 will now be described. As an initial matter, the position of the table may be determined, and adjusted if necessary by translating the table top 82 along frame rails 84. For example, in the above described embodiment in which a panel substrate 98 is located atop an assembly plate 96, an appropriate position comprises positioning the table top 82 where a particular row of panel substrates 98 is properly positioned relative to the robots 14 for panel assembly to proceed.

Figure 14:
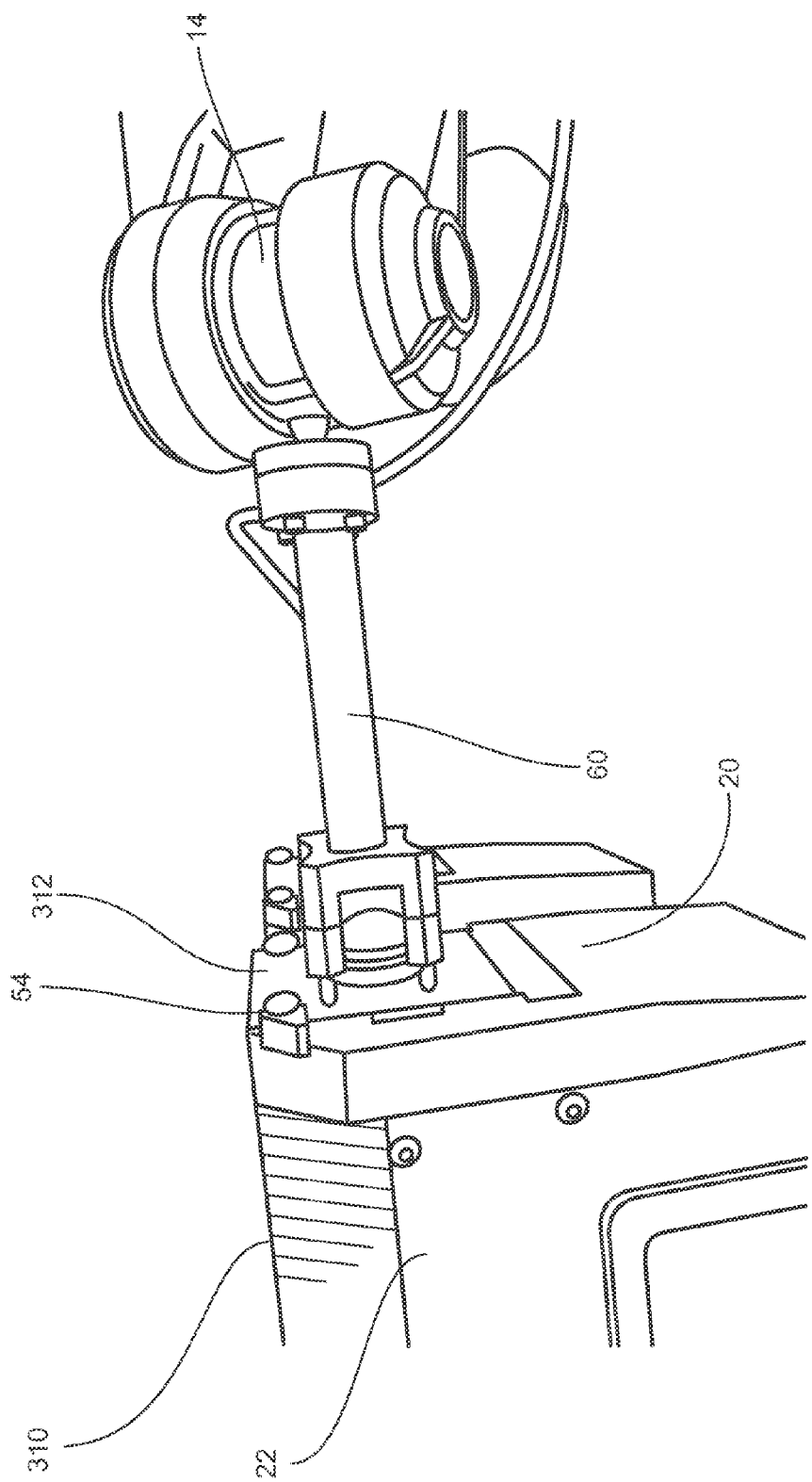

A tile retrieval and placement sequence begins by moving the end effector 60 on robot 14 to a first position for engaging and capturing the front tile in a tile feeder 20. Referring to FIG. 14, the shoe 22 of a tile feeder 20 is loaded with a stack of ceramic tiles 310 ready to be dispensed. A robot end effector 60, such as the type described above in reference to FIG. 9, is brought into gripping engagement with the front tile 312 of the stack. The level of vacuum used for gripping is sufficient to pull the tile 312 firmly against and slightly compress all four spring loaded pins 70 of the end effector 60.

Figure 15:
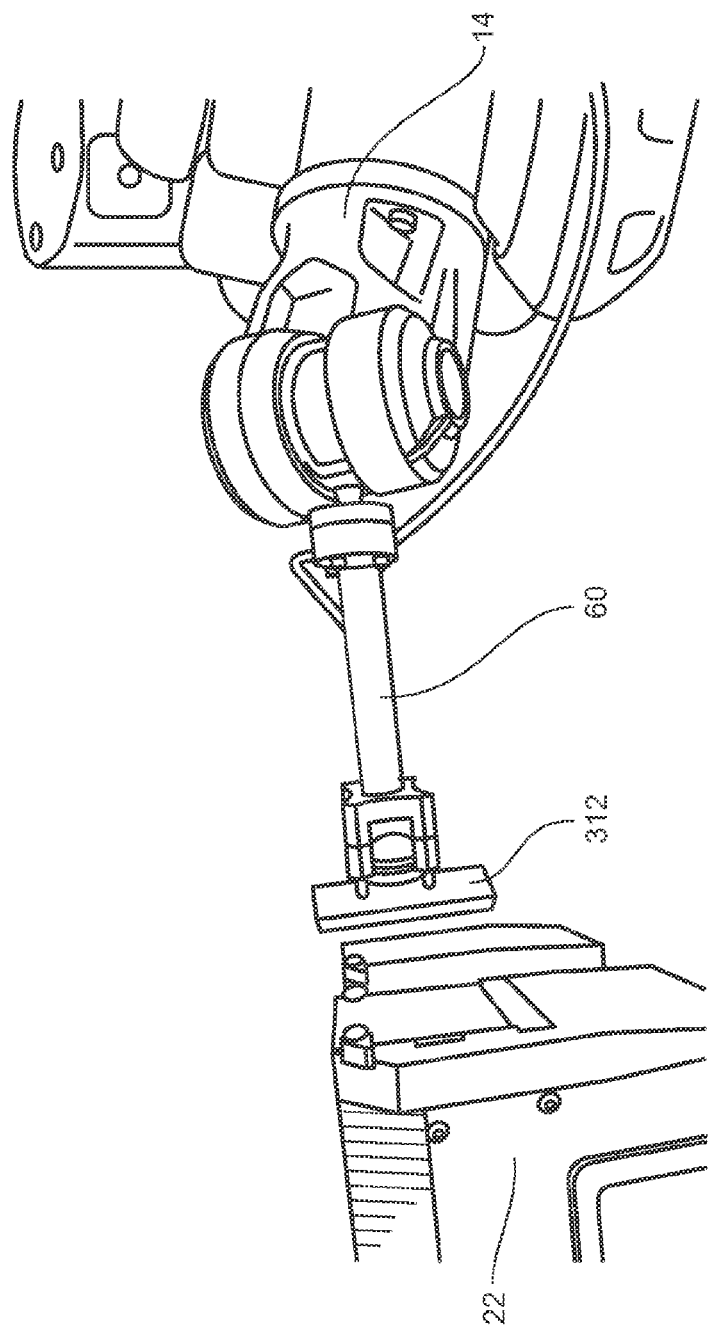
Figure 117:
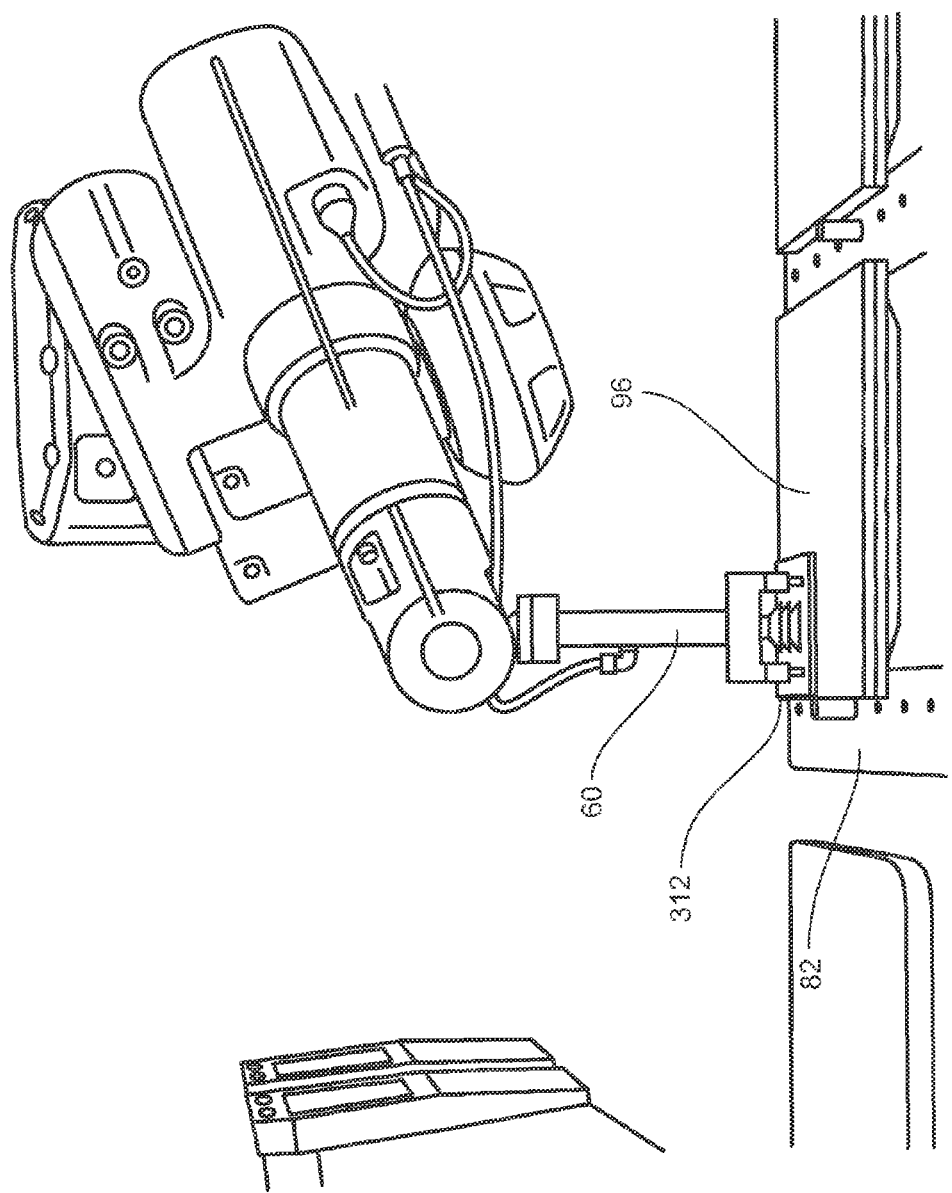

With the tile 312 firmly gripped, the end effector 60 is moved straight away from the end of shoe 22, taking the tile with it as the tile edges push the flexible tabs 54 out of the way. FIG. 15 shows tile 312 positioned slightly away from the end of shoe 22, having been pulled from shoe 22 by the end effector 60. Through a series of coordinated movements the robot then brings the tile to the table above a location at which the tiles are to be assembled. For example, the robot may initially bring the tile to a position as shown in FIG. 16, immediately above and facing a panel substrate 98 positioned on table top 82 of assembly table 12. Panel substrate 98 may be one of a plurality of such panels arrayed about the table top 82, each mounted using dowel pins 94 and an assembly plate 96 in the manner described above in reference to FIGS. 11 and 12. If the table is not already in the proper position, it may be adjusted at this point as described above, prior to tile placement.

If the tile is the first tile to go on the panel substrate 98, placement may simply comprise moving the tile to a position immediately above the intended placement position, and moving the end effector straight down until the tile is seated on the panel substrate 98. FIG. 17 depicts a first tile of a panel assembly being placed on the assembly plate 96 at the end of a movement directly downward by the end-effector from the position of FIG. 16. Once the tile is seated, a downward force may be applied to the tile to press it onto the panel substrate 98 by continuing to move the end effector 60 toward the table. The compliance of the spring loaded pins 70 serves to regulate the pressing force and prevent overloading and damaging the tile. In addition, the surface of the panel substrate may have an adhesive treatment or film to hold the tile in place after the end effector 60 is withdrawn.

Having placed the tile, vacuum is released, and the end effector is lifted away from the table, leaving the first tile accurately positioned at a desired location on panel substrate 98. The robot 14 then returns the end effector 60 to the tile feeder 20 to retrieve the next tile in the stack. The table may again be repositioned as needed prior to, during, or after retrieval of the next tile from the tile feeder.

Figure 18:
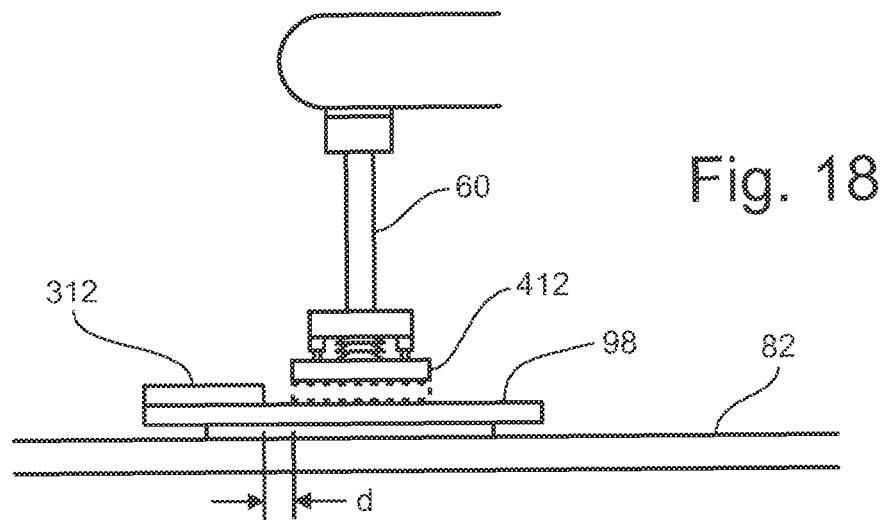
FIGS. 18 through 20 depict a tile being placed on a panel substrate next to a previously placed tile.

In placing second and subsequent tiles on the panel substrate 98, the edges of the previously laid tiles may be advantageously used to help guide the tiles being placed to facilitate a tight assembly. Minimizing the gaps between adjacent tiles may be desirable, for example, when assembling ballistic tiles to form a ballistic armor panel. Referring now to FIG. 18, a second tile 412 is held by end effector 60 proximate a panel substrate 98 on top of which is a previously placed first tile 312. End effector 60 and tile 412 are shown at a starting position in FIG. 18, where the edge of tile 412 is offset from the edge of tile 312 by a small distance "d", and tile 412 is spaced above the panel substrate 98. Tile 412 may be entirely above tile 312 as shown in solid lines, or partially overlapping such that the bottom of tile 412 is below the top of tile 312 as shown by dashed lines.

Figure 19:
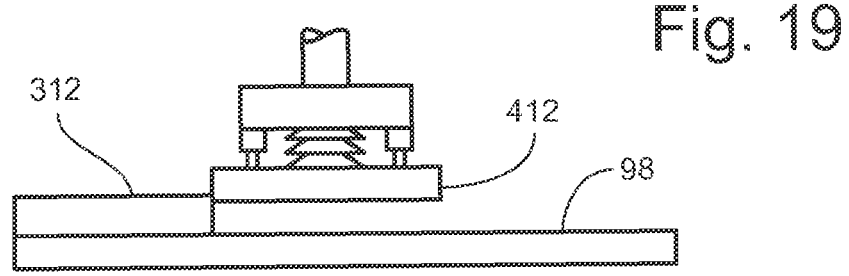
Figure 20:
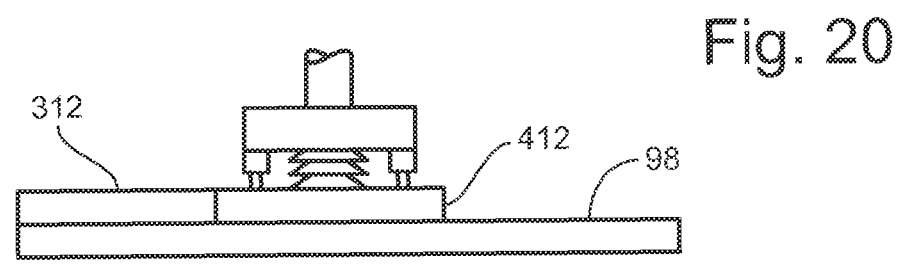

From the starting position of FIG. 18, tile 412 is moved into edge contact with tile 312 as shown in FIG. 19. The end effector may be moved slightly (for example about 0.001 to 0.003 inches) beyond the point of first edge contact to ensure full edge contact between the two tiles, or as close to full contact as possible. The resulting slight interference may be accommodated through compliance of the end effector's grip on tile 412, in particular through lateral flexibility of the pins 70 and bellows 74, and by slipping of the tile relative to pins 70 if needed. With the tile edges in contact, and a slight lateral pressure of tile 412 against tile 312, tile 412 is moved directly downward into contact with panel substrate 98 and pressed into place as shown in FIG. 20.

Figure 21:
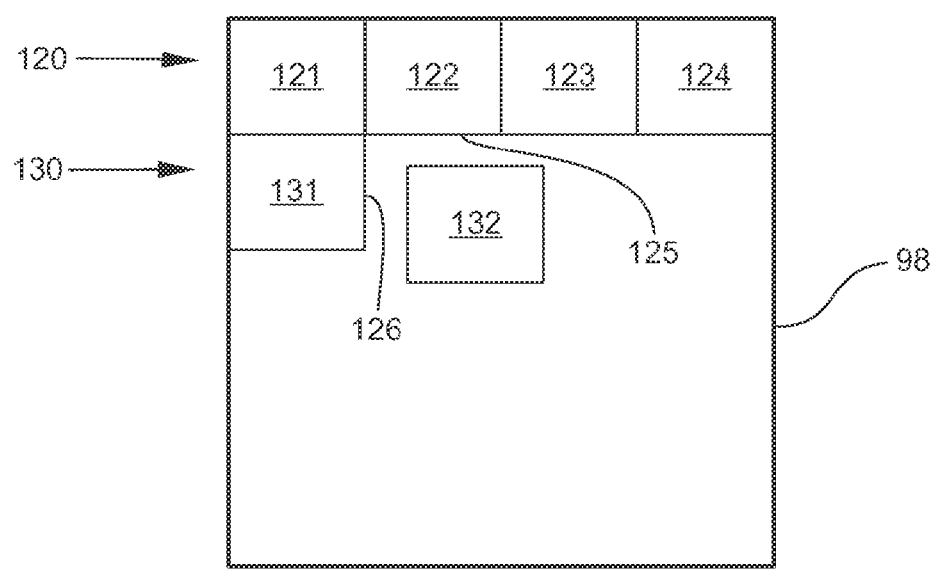
FIG. 21 is a schematic view of a starting position when placing a tile into a corner formed by two previously placed tiles.
Figure 23:
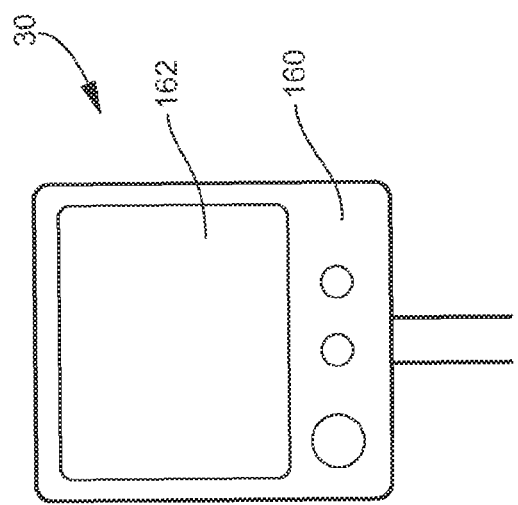
FIG. 23 is a schematic representation of a human machine interface (HMI)

The above described sequence of using a previously placed tile to guide a next tile may be repeated to lay a row of tiles, for example, along an edge of a panel substrate 98. For panels that include more than one row of tiles, the same process may be continued, with a minor change to accommodate placing tiles that abut two previously placed tiles instead of one. FIG. 21 shows a partially completed panel substrate 98 already containing a first row 120 of tiles 121 through 124, and a first tile 131 of a second row 130. Edge 125 of tile 122 and edge 126 of tile 131 form a corner for receiving the next tile (132) of the second row 130. Tile 132 is shown in an offset starting position, in this case laterally offset from both tiles 122 and 131, and again spaced above the panel like tile 412 in FIG. 18. From this starting position, tile 132 may be moved at an approximate 45 degree angle toward the corner formed by tiles 122 and 131, until contacting both tiles, and still spaced above panel substrate 98 in the manner of tile 412 in FIG. 19. A compliant pressure may be applied along both contacting edges by again moving the end effector slightly beyond the point of contact on the same angled path. From there the tile is pressed straight down onto the substrate while maintaining the compliant lateral pressure against tiles 122 and 131 until the tile is firmly seated on panel substrate 98. The end effector may then be released from tile 132 and sent back to the tile feeder for another tile. The above process can be repeated in any required sequence to complete the second row 130, and any additional rows needed for a particular panel. It should further be appreciated that the movable table top 82 may be repositioned as needed during a panel assembly process, such as between tile rows.

Figure 22:
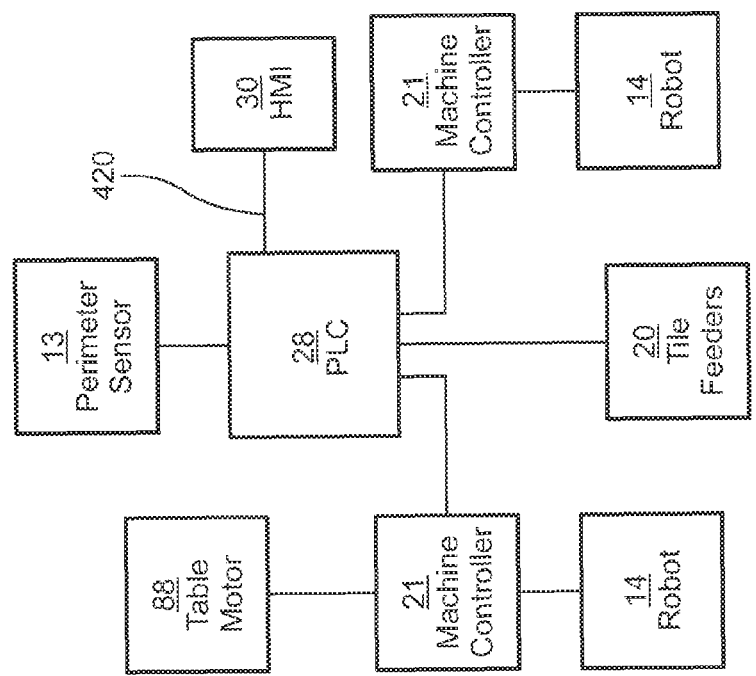
FIG. 22 is a schematic representation of an exemplary automated tile placement machine control system.

FIG. 22 is a schematic representation of an exemplary tile placement machine control system showing the previously mentioned machine and control elements connected by communication and control links 420. The PLC 28 acts as the central master controller, taking user instructions from the HMI 30, and coordinating the activities of the machine elements and the other controllers. In the depicted control system embodiment, control instructions are communicated via communication and control links 420 directly from PLC 28 to the tile feeders 20, and indirectly to table 12 through one of the machine controllers 21. The robots 14 receive their control instructions directly from machine controllers 21.

The control system may further comprise a perimeter encroachment sensor 13 connected via control link to the PLC 28. The encroachment sensor 13 may incorporate any of various known motion or proximity detection technologies for detecting a physical violation of a prescribed boundary around the tile placement machine. For example, the sensor may be configured to detect a person stepping or leaning across a defined boundary plane marked by a line on the floor around the tool. The PLC 28 may be programmed to then take a particular action upon receiving a violation signal from the sensor 13, such as transmitting a stop signal to the machine and control elements. The PLC may further issue an audio and/or visual alarm to alert the user that a perimeter violation has occurred. The user may then access the HMI 30 to take appropriate action, such as clearing the alarm, and restarting the tile assembly process. It should be appreciated that the location of the boundary line, and the actions required when a violation occurs may be defined to comply with federal regulations specifically governing operation of automated machinery, namely for example, OSHA Guidelines for Robotic Safety: STD01-12-002-PUB8-1.3; and OSHA 29 CFR 1920 Subpart O, 1910.211 & 212.

User input to the tile placement machine is via the HMI 30 through a communication/control link 420 to the PLC 28. The HMI 30 may comprise a control panel 160 with physical control buttons, and a controllable touch screen 162. The control panel 160 may include control buttons for basic operational functions, such as for example emergency stop (Estop), cycle start, and cycle stop. The controllable touch screen 162 may be programmed to present a series of screen images with various information displays and control options. For example, one such screen image may provide the ability to select a tile placement pattern from a library of pre-loaded recipes. The same screen or another screen may then present an option for the user to instruct the PLC 28 to automatically run the selected recipe. This may involve executing a software program for controlling the robots, tile feeders, and movable table in a particular coordinated manner in accordance with the selected recipe.

Figure 24:
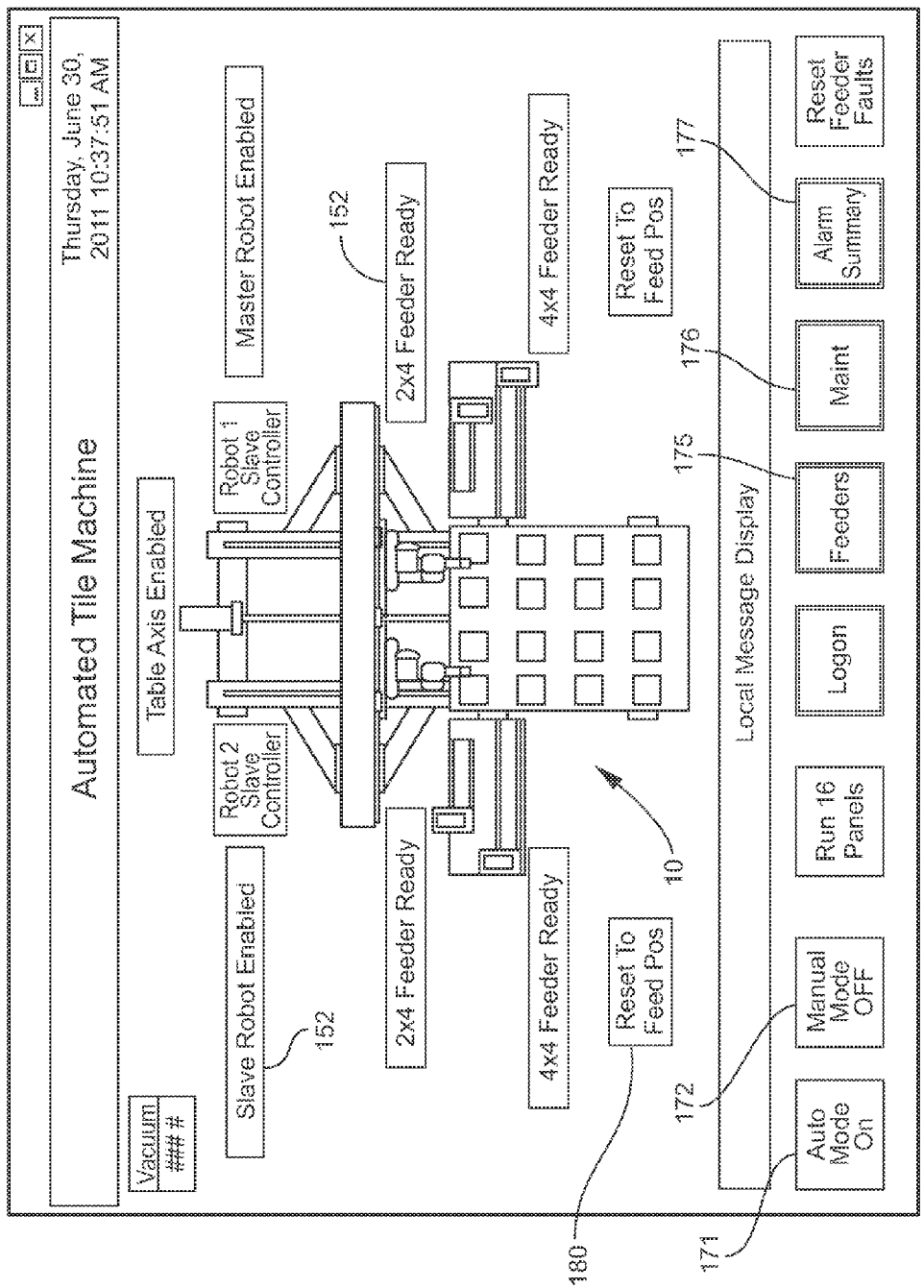
FIGS. 24 through 26 are exemplary screen images that may be displayed on an HMI such as that of FIG. 23.
Figure 25:
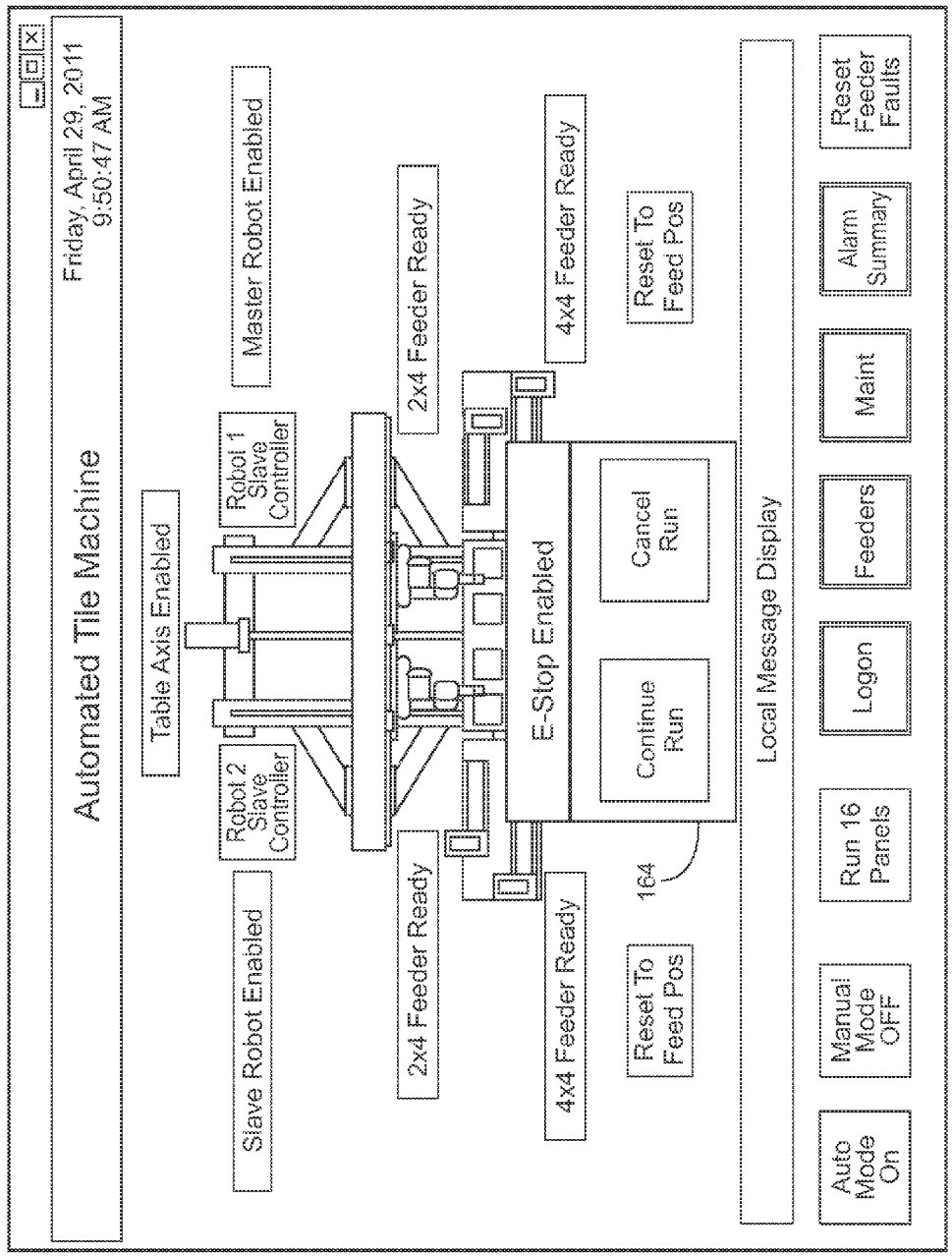
Figure 26:
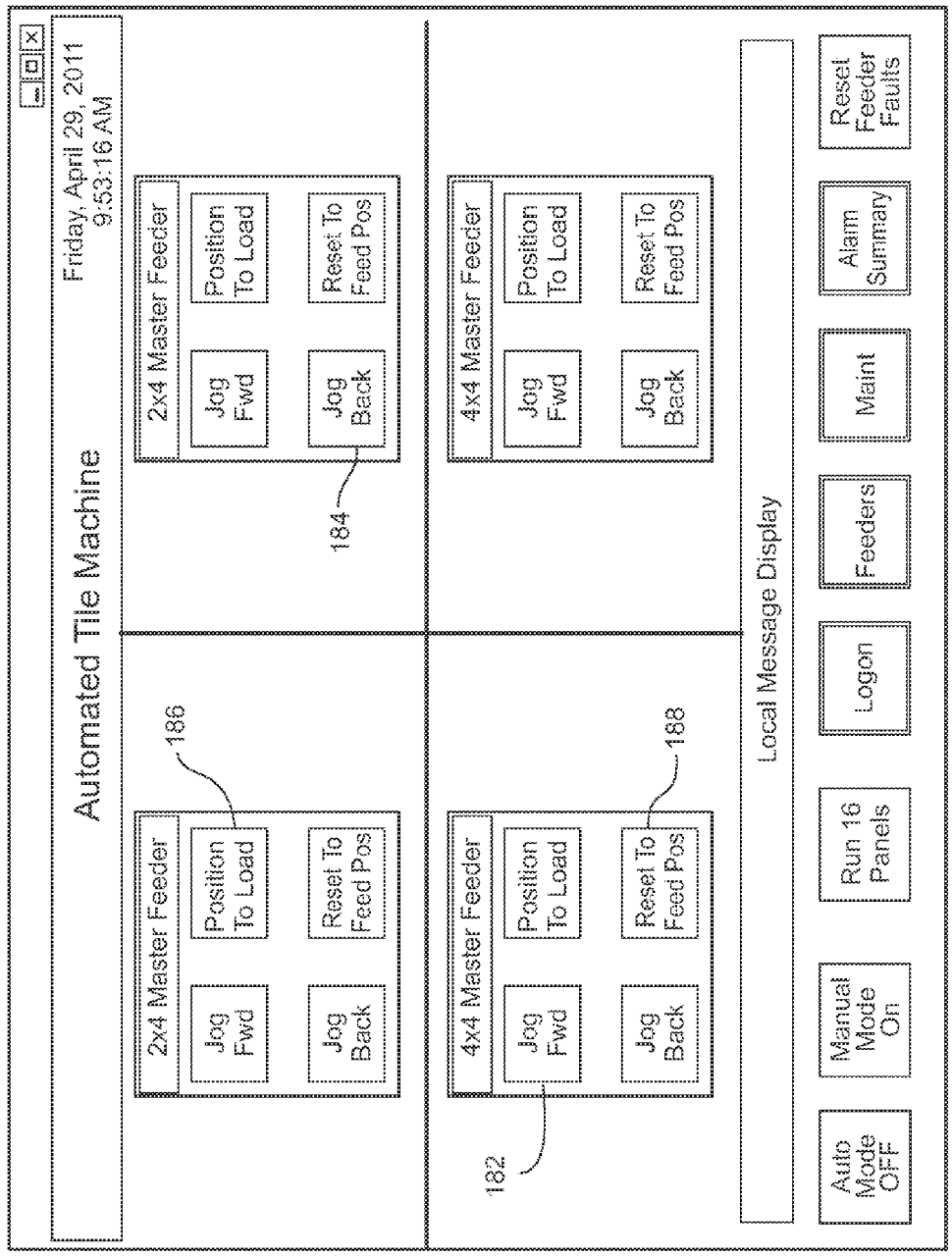

Selected exemplary touch screen images are shown in FIGS. 24 through 26. Referring initially to FIG. 24, the displayed image includes a graphical representation of the tile placement machine 10 along with status information and control options. The status information comprises for example status boxes 152 next to the tile feeders, table drive, robot controllers, and other operable mechanical elements shown on the screen image. Each of boxes 152 indicates whether the particular mechanical element is ready or not ready for a particular operation to proceed. Status information is also provided by the "Auto Mode" 171 and "Manual Mode" 172 on/off boxes located at the bottom left portion of the image of FIG. 24. Boxes 171, 172 serve as a quick reference to the operator for determining whether the tile placement machine is in automatic or manual operation mode. On the same screen an operator may also select from various control options, such as for example the "Maint" button 176 at the bottom of the image to perform diagnostics checks on the machine, or the "Alarm Summary" button 177 to view a history of alarm events. Pushing one of the "Reset To Feed Pos" buttons 180 will cause the tile feeders on that side to move the tile stacks forward, if needed, to bring the front tile in position to be picked by the robot.

If an automatic tile assembly process is interrupted for any reason, such as by a machine perimeter violation, or activation of the emergency stop, an alert may be displayed on the touch screen. The alert may also include options for continuing or discontinuing the automatic assembly process. For example, shown in the middle of the screen image of FIG. 25 is an alert box 164 indicating that the emergency stop has been activated by manual operation of the Estop button on control panel 160. The alert box 164 further provides an option for continuing the automatic assembly process from the point where it left off (after manually resetting the Estop button), and an option for canceling the run altogether.

When the control system is in manual operation mode, automatic tile assembly is disabled, while various other manual controls are enabled. The enabled manual controls may allow the operator to perform operations such as for example clearing faults, loading tiles, resetting a tile feeder, and the like. FIG. 26 is an example of a touch screen image accessible in manual mode from another screen image, in particular by touching the "Feeders" button 175 at the bottom of the touch screen image of FIG. 24. The particular image of FIG. 26 is intended to be used specifically for performing certain manual and semi-automatic operations with the tile feeders. For example, a tile feeder trolley may be manually moved forward, toward the open end of the shoe, or backward, away from the open end of the shoe, by touching either the "Jog Fwd" and "Jog Back" buttons 182, and 184 respectively. Alternatively, a trolley may be moved all the way back to allow for loading a stack of tiles into the shoe by touching the "Position To Load" button 186, or reset as described previously using a Reset To Feed Pos button 188.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An automated machine for assembling individual tiles on a substrate surface in a predetermined pattern, comprising:
    a tile feeder with an open ended shoe portion adapted for holding a stack of regularly shaped tiles, and a tile advancement mechanism for incrementally advancing tiles in the shoe toward the open end thereof; and
    a six axis robot with a vacuum end effector adapted to retrieve a tile from the end of the tile stack, and place the tile on the substrate surface, wherein the vacuum end effector comprises at least three compressible pins surrounding a flexible bellows.

2. The automated machine of claim 1, wherein the surface is linearly and incrementally movable relative to the tile feeder.

3. The automated machine of claim 1, further comprising a sensor for determining when a front tile in the stack is at the open end of the shoe.

4. The automated machine of claim 3, wherein the sensor comprises a laser switch.

5. A tile dispenser for holding a generally horizontal stack of four sided tiles, and presenting the tiles one at a time for retrieval by a robotic mechanism; comprising:
- an elongated shoe for receiving the stack of tiles, the shoe having an open end;
- a tile advancement mechanism adapted for incrementally advancing the stack of tiles toward the open end of the shoe; and
- a sensor for determining when a front tile in the stack is at the open end of the shoe.

6. The tile dispenser of claim 5, wherein the tile advancement mechanism comprises a moveable plate abutting a back end of the tile stack.

7. The tile dispenser of claim 6, wherein the moveable plate comprises a rolling trolley driven by a linear actuator.

8. The tile dispenser of claim 5, wherein the sensor comprises a laser switch.

9. The tile dispenser of claim 5, further comprising guide rails disposed in the bottom and sides of the shoe.

10. The tile dispenser of claim 9, further comprising registration means at the open end of the shoe for positioning a front tile of the stack in an accurately repeatable position.

11. The tile dispenser of claim 10, wherein the registration means comprises a pneumatic actuator on one side of the open end of the shoe adapted to push the front tile toward the opposite side of the shoe.

12. The tile dispenser of claim 11, wherein the shoe is inclined from the horizontal with the open end elevated.

13. A method of using a robotic mechanism to retrieve individual tiles from a stack of tiles in a tile dispenser, and place the tiles on a surface in a predetermined pattern, comprising:
- retrieving a first tile from the end of the tile stack in the dispenser;
- placing the first tile on the surface;
- retrieving a second tile from the dispenser;
- bringing the second tile into contact with the first tile by orienting the second tile to be facing the surface and separated laterally from the first tile by a gap, and moving the second tile across the gap toward the first tile until a lower portion of a first edge of the second tile is touching an upper portion of a first edge of the first tile; and
- moving the second tile substantially toward and onto the surface while maintaining edge contact with the first tile, wherein edge contact between the first and second tiles is maintained by using the robotic mechanism to urge the second tile toward the first tile with a small lateral force.

14. The method of claim 13, wherein the small lateral force is due to compliance in the robotic mechanism.

15. The method of claim 14, further comprising retrieving and placing additional tiles on the surface in a prescribed manner to create a tile panel, wherein the surface is the surface of a panel substrate mounted atop a linearly moveable table.

16. The method of claim 15, further comprising indexing the linearly moveable table and creating a second tile panel on a second panel substrate.

* * * * *